United States Patent
Kato et al.

(10) Patent No.: US 12,484,951 B2
(45) Date of Patent: Dec. 2, 2025

(54) POWER SUPPLY DEVICE AND ABLATION SYSTEM

(71) Applicant: Japan Lifeline Co., Ltd., Tokyo (JP)

(72) Inventors: Makoto Kato, Tokyo (JP); Takuya Hirao, Tokyo (JP); Hisao Miyamoto, Tokyo (JP)

(73) Assignee: JAPAN LIFELINE CO., LTD., Tokyo (JP)

(*) Notice: Subject to any disclaimer, the term of this patent is extended or adjusted under 35 U.S.C. 154(b) by 275 days.

(21) Appl. No.: 18/252,576

(22) PCT Filed: Feb. 22, 2021

(86) PCT No.: PCT/JP2021/006669
§ 371 (c)(1),
(2) Date: May 11, 2023

(87) PCT Pub. No.: WO2022/176202
PCT Pub. Date: Aug. 25, 2022

(65) Prior Publication Data
US 2024/0016536 A1 Jan. 18, 2024

(51) Int. Cl.
*A61B 18/14* (2006.01)
*A61B 18/12* (2006.01)
*A61B 18/00* (2006.01)

(52) U.S. Cl.
CPC ...... *A61B 18/1206* (2013.01); *A61B 18/1492* (2013.01); *A61B 2018/0016* (2013.01); *A61B 2018/00267* (2013.01); *A61B 2018/00351* (2013.01); *A61B 2018/00577* (2013.01); *A61B 2018/00613* (2013.01); *A61B 2018/00767* (2013.01); *A61B 2018/124* (2013.01)

(58) Field of Classification Search
CPC ...... A61B 18/1206; A61B 2018/00767; A61B 2018/00613; A61B 2018/00761; A61B 2018/124; A61N 1/327
See application file for complete search history.

(56) References Cited

U.S. PATENT DOCUMENTS

2010/0261994 A1* 10/2010 Davalos ............. A61B 18/1477
600/407
2012/0220999 A1* 8/2012 Long ................. A61B 18/1477
606/41

(Continued)

FOREIGN PATENT DOCUMENTS

EP 4074272 A1 * 10/2022 ......... A61B 18/1206
JP 2010-503496 A 2/2010
JP 2018-515247 6/2018

(Continued)

*Primary Examiner* — Sean W Collins
(74) *Attorney, Agent, or Firm* — MUNCY, GEISSLER, OLDS & LOWE, P.C.

(57) ABSTRACT

A power supply device according to an embodiment of the disclosure includes a power source unit configured to supply power for performing ablation using irreversible electroporation to a plurality of electrodes in an ablation catheter, and a control unit configured to control pulse voltages such that when the ablation is performed by supplying the power, the pulse voltages with a plurality of types of positive amplitude values are applied to three or more application electrodes including the plurality of electrodes.

6 Claims, 8 Drawing Sheets

(56) References Cited

U.S. PATENT DOCUMENTS

2021/0161592 A1* 6/2021 Altmann ............ A61B 18/1492
2021/0307815 A1* 10/2021 Govari ............... A61B 18/1206

FOREIGN PATENT DOCUMENTS

| JP | 2019500170 | 1/2019 |
| JP | 2020-517355 A | 6/2020 |
| WO | WO 2017/119934 A1 | 7/2017 |
| WO | WO 2020/094622 A1 | 5/2020 |

* cited by examiner

POWER SUPPLY DEVICE AND ABLATION SYSTEM

CROSS REFERENCE TO RELATED APPLICATIONS

This application claims priority to International Application No. PCT/JP2021/006669, filed on Feb. 22, 2021, the entire contents of which are hereby incorporated by reference.

TECHNICAL FIELD

The disclosure relates to an ablation system including an ablation catheter for performing ablation and a power supply device that supplies power for performing ablation, and a power supply device applied to the ablation system.

BACKGROUND

As medical equipment for treating an affected area (e.g., an affected area with a tumor such as cancer) in the body of a patient, there is an ablation system for performing ablation on the affected area. This ablation system includes an electrode catheter serving as an ablation catheter, and a power supply device that supplies power for performing ablation. In addition, JP 2019-500170 T discloses an ablation system that performs ablation using irreversible electroporation (IRE), for example.

SUMMARY

For such an ablation system, it is commonly desired to improve the effectiveness of the ablation treatment. It is desirable to provide a power supply device and an ablation system that can improve the effectiveness of the ablation treatment.

A power supply device according to an embodiment of the disclosure includes a power source unit configured to supply power for performing ablation using irreversible electroporation to a plurality of electrodes in an ablation catheter, and a control unit configured to control pulse voltages with a plurality of types of positive amplitude values such that when the ablation is performed by supplying the power, the pulse voltages are applied to three or more application electrodes including the plurality of electrodes.

The ablation system according to the embodiment of the disclosure includes an ablation catheter with a plurality of electrodes and the above-described power supply device according to the embodiment of the disclosure.

In the power supply device and the ablation system according to the embodiment of the disclosure, when the ablation using the irreversible electroporation is performed, the pulse voltage is controlled such that the pulse voltages with a plurality of types of positive amplitude values are applied to the three or more application electrodes. Here, in the ablation using the irreversible electroporation, it is commonly necessary to apply a significantly high voltage (pulse voltage) to the electrode, but the electrostatic discharge from the end portion of the electrode is easily generated due to the electric-field concentration resulting from the high voltage. When such an electrostatic discharge occurs at the end portion of the electrode, thrombus may occur, and the indwelling position of the ablation catheter may be displaced by the impact of the electrostatic discharge during the ablation treatment. In view of this, through the control of applying the pulse voltages with the plurality of types of positive amplitude values, the electric-field concentration due to high pulse voltages is easily suppressed and the electrostatic discharge from the end portion of the application electrode occurs less, and as a result, the occurrence of thrombus and the displacement of the indwelling position of the ablation catheter are easily inhibited.

Here, the control unit may perform a control such that an absolute value of an amplitude value difference of the pulse voltages between application electrodes adjacent to each other among the three or more application electrodes is a first threshold value or smaller by using the pulse voltages with the plurality of types of positive amplitude values, and that as a result an intensity of an electric field in a vicinity of the application electrodes adjacent to each other is a predetermined electric field threshold value or smaller. In this case, the intensity of the electric field in the vicinity of the application electrodes adjacent to each other becomes the predetermined electric field threshold value or smaller, and thus the electric-field concentration is further easily suppressed. Thus, the electrostatic discharge is further less generated, and the occurrence of thrombus and the displacement of the indwelling position of the ablation catheter are further easily suppressed. As a result, the effectiveness of the ablation treatment is further improved.

In this case, the control unit may perform a control such that a maximum value of the absolute value of the amplitude value difference of the pulse voltages between the application electrodes adjacent to each other is a second threshold value or greater. In this manner, the absolute value of the amplitude value difference of the pulse voltages is controlled to be the first threshold value or smaller while the maximum value of the absolute value of the amplitude value difference is secured at a minimum value (the second threshold value) or greater, and the following is achieved. That is the electric-field concentration is suppressed while ensuring the range (ablation range) in which the electric field is generated. As a result, the effectiveness of the ablation treatment is further improved.

In addition, the three or more application electrodes may be all composed of three or more electrodes serving as the plurality of electrodes in the ablation catheter. In this case, the application electrode to which the pulse voltage to be controlled during ablation is applied is composed only of the electrodes (the three or more electrodes) of the ablation catheter, and thus the pulse voltage can be easily controlled. As a result, the convenience of the ablation is improved. Note that examples of the three or more application electrodes include the counter electrode plate, in addition to the electrode of the ablation catheter.

Note that examples of the ablation catheter include a catheter used for treating arrhythmias through ablation on the affected area in the body of a patient. In addition, the part to be subjected to the ablation may be an affected area with a tumor in the body of a patient.

The power supply device and the ablation system according to the embodiment of the disclosure control the pulse voltage such that the pulse voltages with the plurality of types of positive amplitude values are applied to the three or more application electrodes when performing the ablation using the irreversible electroporation, and thus the following is achieved. That is, the occurrence of thrombus and displacement of the indwelling position of the ablation catheter are easily suppressed. Thus, the effectiveness of the ablation treatment can be improved.

DESCRIPTION OF EMBODIMENTS

Figure 1:
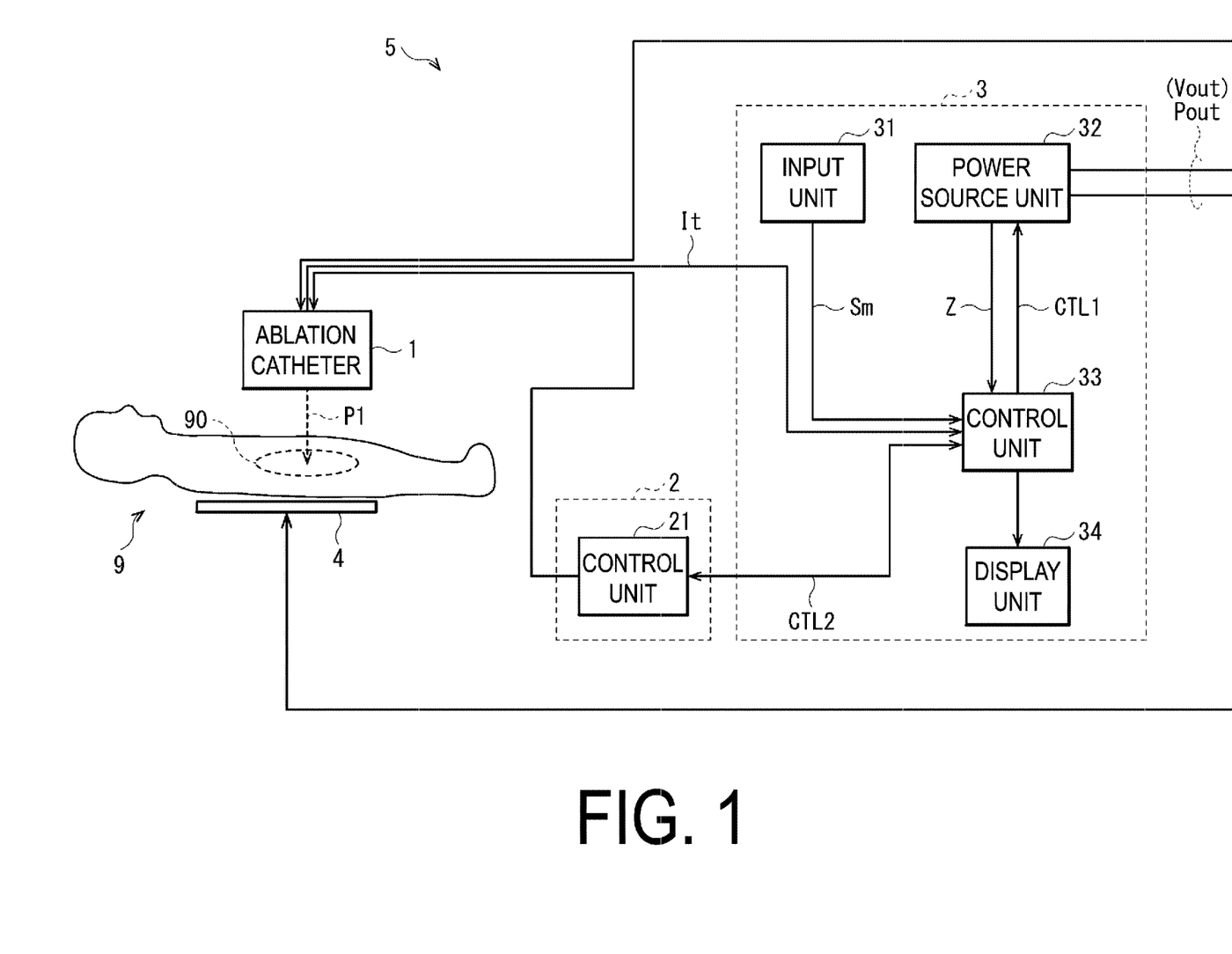
FIG. 1 is a block diagram schematically illustrating an overall configuration example of an ablation system according to an embodiment of the disclosure.

An embodiment of the disclosure is elaborated below with reference to the accompanying drawings. Note that description will be made in the following order.
1. Embodiment (example in which voltage control for four electrodes of an ablation catheter is performed)
2. Modifications 1. Embodiment Configuration FIG. 1 is a block diagram schematically illustrating an overall configuration example of an ablation system 5 according to an embodiment of the disclosure. As illustrated in FIG. 1, for example, the ablation system 5 is a system used for treating an affected area 90 in the body of a patient 9, and performs a predetermined ablation on the affected area 90. Note that examples of the affected area 90 include affected areas with arrhythmia and the like, and affected areas with tumors such as cancer (e.g., liver, lung, breast, kidney, thyroid and the like).

Here, as elaborated later, in the ablation system 5 of the embodiment, non-thermal ablation using irreversible electroporation (IRE) is performed as the ablation for the affected area 90.

As illustrated in FIG. 1, the ablation system 5 includes an ablation catheter 1, a liquid supply device 2, and a power supply device 3. In addition, during ablation using the ablation system 5, a counter electrode plate 4 illustrated in FIG. 1 is also used as necessary, for example.

A. Ablation Catheter 1

The ablation catheter 1 is an electrode catheter that is inserted into the body of the patient 9 through the blood vessel to perform treatment of the arrhythmia, tumors and the like through the ablation on the affected area 90, for example. In addition, the ablation catheter 1 includes an irrigation mechanism for ejecting (injecting) a predetermined irrigation liquid L (e.g., physiological saline and the like) from the distal end side during the ablation. In other words, the ablation system 5 is an ablation system with such an irrigation mechanism. Note that the liquid L is supplied from the liquid supply device 2 described later into the ablation catheter 1 so as to circulate inside (see FIG. 1).

Figure 2:
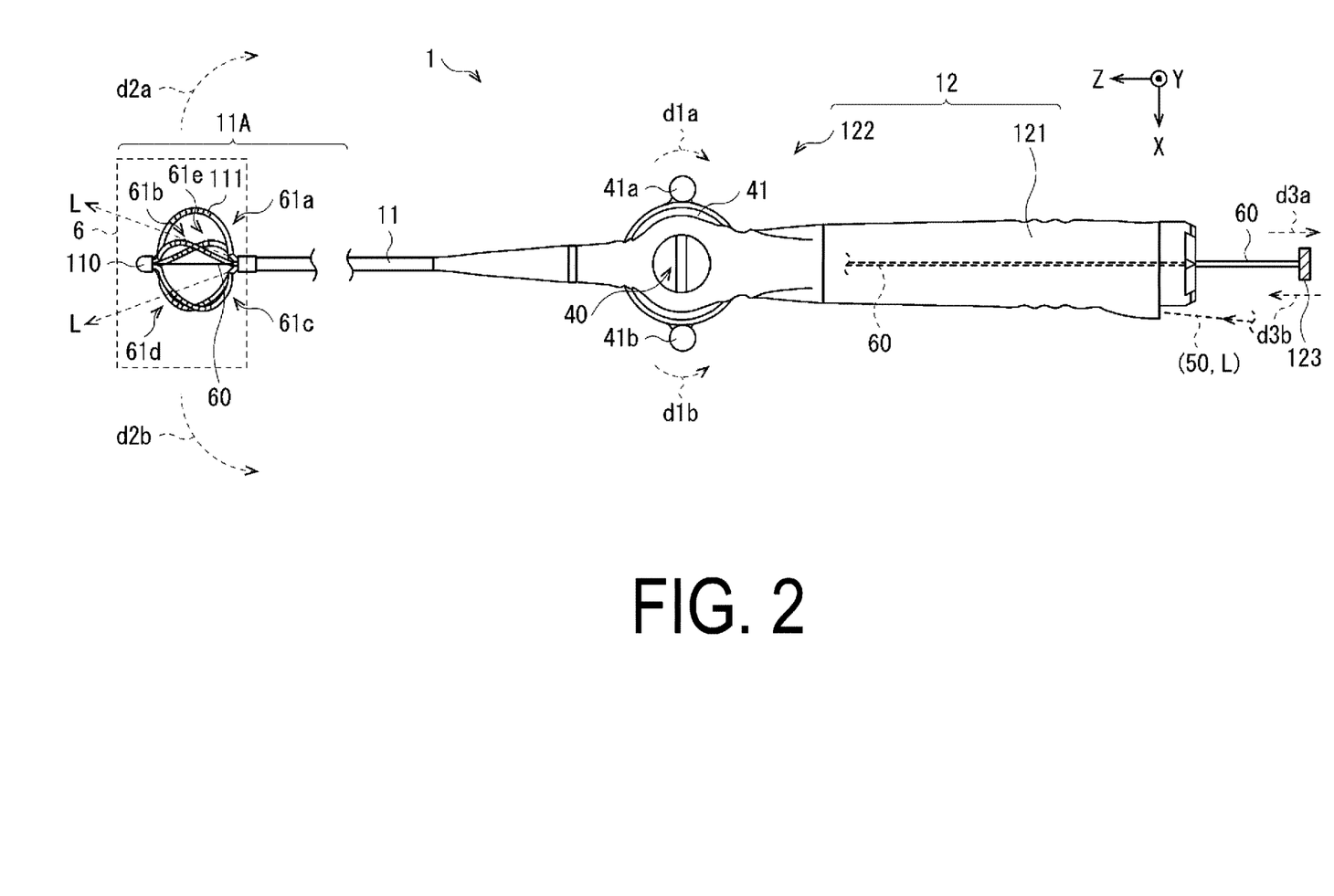
FIG. 2 is a schematic diagram illustrating a specific configuration example of an ablation catheter illustrated in FIG. 1.

FIG. 2 schematically illustrates a specific configuration example of the ablation catheter 1. The ablation catheter 1 includes a catheter shaft 11 (catheter tube) serving as a catheter body (longitudinal portion), and a handle 12 attached to the proximal end side of the catheter shaft 11.

Catheter Shaft 11

The catheter shaft 11 is composed of a flexible tubular structure (hollow tubular member), and has a shape extending along its axial direction (Z-axis direction) (see FIG. 2). Specifically, the axial length of the catheter shaft 11 is several to several dozen times longer than the length of the handle 12 in the axial direction (Z-axis direction).

As illustrated in FIG. 2, the catheter shaft 11 includes a distal end portion (distal end flexible portion 11A) configured to be relatively excellent in flexibility. In addition, as illustrated in FIG. 1, a predetermined near-distal end structure 6 described later is provided in the distal end flexible portion 11A. In addition, the catheter shaft 11 has a so-called multiple lumen structure in which a plurality of lumens (such as inner holes, minute holes, and through holes) extending along its axial direction (Z-axis direction) is formed inside. In the lumen in the catheter shaft 11, various thin wires (such as a conductive wire 50, a deflection wire, and a deformation wire 60 described later) are inserted in an electrically isolated state. In addition, inside the catheter shaft 11, a lumen extending along the axial direction for carrying the irrigation liquid L is formed in addition to the lumen for inserting the various thin wires.

The outer diameter of the catheter shaft 11 is about 0.3 to 4.0 mm, and the axial length of the catheter shaft 11 is about 300 to 1500 mm, for example. In addition, examples of the material of the catheter shaft 11 include thermoplastic resins such as polyamide, polyether polyamide, polyurethane, polyether block amide (PEBAX) (trade name) and nylon.

Here, as illustrated in FIG. 2, the near-distal end structure 6 includes a branch point (located on the proximal end side of the near-distal end structure 6) of the catheter shaft 11, a joining point located near the most distal end of the catheter shaft 11 (near a distal end tip 110 described later), and a plurality of (in this example, five) branch structures 61a to 61e, which are portions for connecting each of the branch point and the joining point in a curved shape. The branch structures 61a to 61e are spaced apart from each other at substantially even intervals in the plane (X-Y plane) orthogonal to the axial direction (Z-axis direction) of the catheter shaft 11.

In addition, as illustrated in FIG. 2, in the branch structures 61a to 61e, one or a plurality of electrodes 111 (in this example, four electrodes 111) are spaced apart from each other at a predetermined interval along the extension direction of their curved shapes. Each electrode 111 is a ring-shaped electrode. On the other hand, the distal end tip 110 is disposed at the joining point (near the most distal end of the catheter shaft 11) of the branch structures 61a to 61e.

Each electrode 111 is an electrode for potential measurement or an electrode for ablation as described above, and is composed of a metal material with good electrical conductivity such as aluminum (Al), copper (Cu), SUS, gold (Au), and platinum (Pt), for example. On the other hand, the distal end tip 110 is composed of the same metal material as that of each electrode 111, and composed of a resin material such as silicone rubber resin and polyurethane, for example. Note that examples of the parameters of each electrode 111 suitable for the ablation using the irreversible electroporation include the following parameters. That is, preferably, the length (the electrode length along the axial direction of the catheter shaft 11) of each electrode 111 is about 0.3 to 5.0 mm, and the distance between the electrodes 111 next to each other in the axial direction of the catheter shaft 11 is about 0.3 to 5.0 mm.

The distal end side of the conductive wire 50 is individually electrically connected to each electrode 111. In addition, the proximal end side of each conductive wire 50 can be connected to the outside of the ablation catheter 1 through the inside of the handle 12 from the inside of the catheter shaft 11. Specifically, as illustrated in FIG. 1, the proximal end side of each conductive wire 50 can be taken out to the outside from the proximal end portion (connector portion) along the Z-axis direction in the handle 12.

Note that the four electrodes 111 disposed in each of the branch structures 61a to 61e correspond to specific examples of the "three or more electrodes" and "three or more application electrodes" in the disclosure.

Here, the shape of the near-distal end structure 6 is configured to change (deform) in accordance with a deformation operation on the handle 12 described later (an operation on a deformation operation portion 123 described later). Specifically, the shape of the near-distal end structure 6 changes between a non-deployed shape (constricted shape: see FIGS. 3A and 3B described later) in which the near-distal end structure 6 is not deployed along the axial direction (Z-axis direction), and a deployed shape (extended shape: see FIG. 2 and FIGS. 4A and 4B described later) in which the near-distal end structure 6 is deployed along the axial direction from the non-deployed shape. As elaborated later, examples of the non-deployed shape (first shape) include a "petal shape" (an example of a case of a flat shape: see FIGS. 3A and 3B described later) formed by the plurality of branch structures 61a to 61e. On the other hand, examples of the deployed shape (second shape) include a shape with the petal shape (each of the branch structures 61a to 61e) deployed along the axial direction (so-called "basket shape": see FIG. 2 and FIGS. 4A and 4B described later).

Figure 4A:
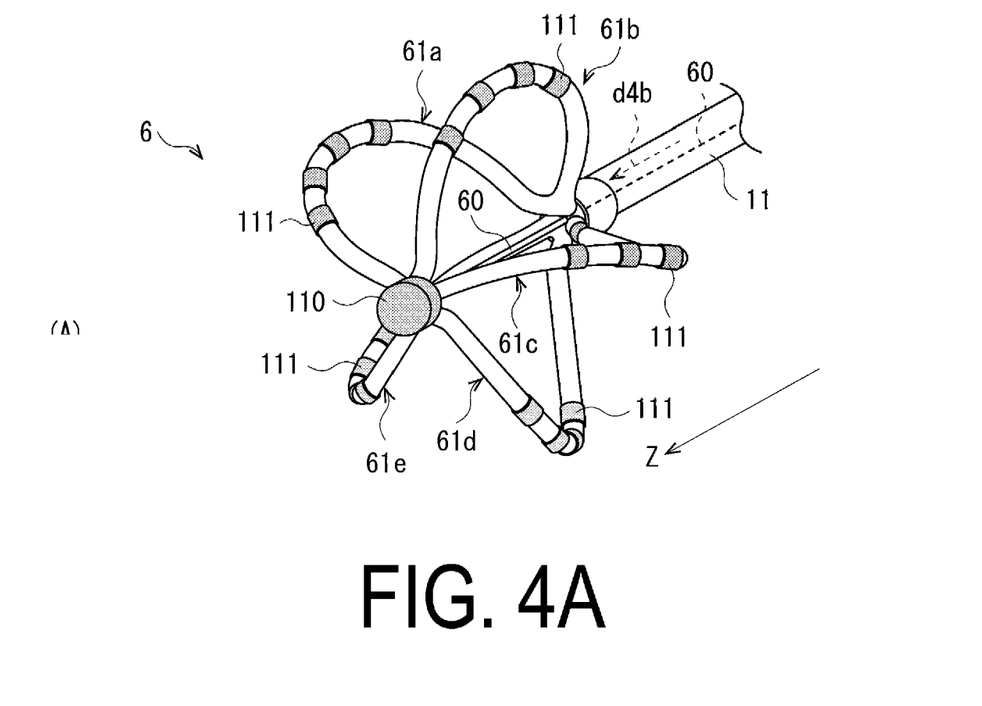
FIGS. 4A and 4B are schematic diagrams illustrating an example of another deformed state of a portion near the distal end of the catheter shaft illustrated in FIG. 2.
Figure 4B:
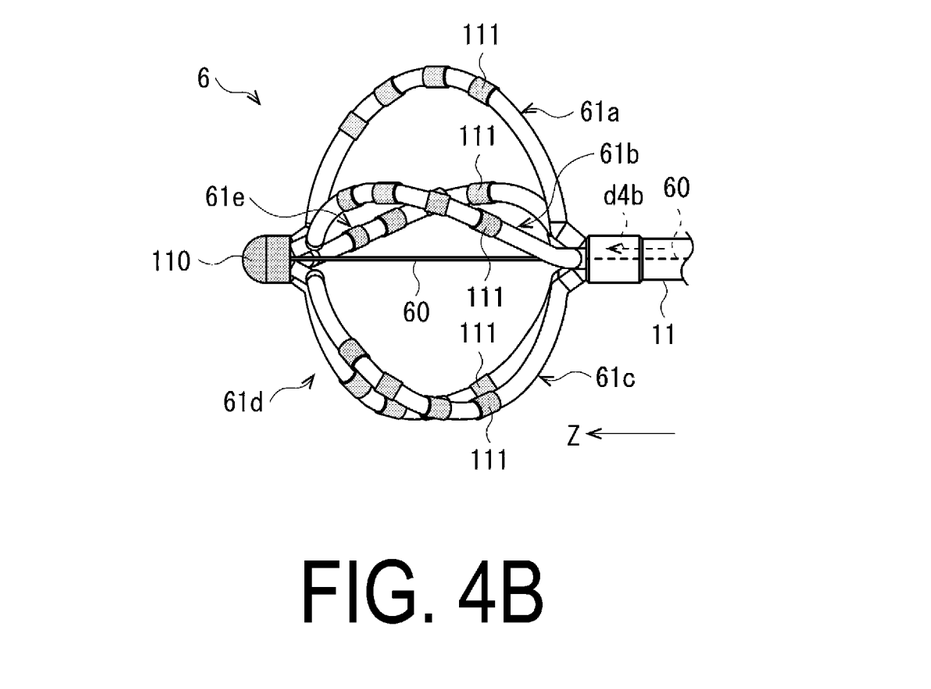

Note that the "basket shape" means that the shape formed by the plurality of the branch structures 61a to 61e resembles a curved pattern formed on the surface of a basketball as illustrated in FIG. 2 and FIGS. 4A and 4B, for example.

Handle 12

The handle 12 is a portion configured to be grabbed (gripped) by an operator (doctor) using the ablation catheter 1. As illustrated in FIG. 2, the handle 12 includes a handle body 121 attached to the proximal end side of the catheter shaft 11, a rotation operation portion 122, and the deformation operation portion 123.

The handle body 121 corresponds to the portion (holding portion) actually gripped by the operator, and has a shape extending along its axial direction (Z-axis direction). The handle body 121 is composed of a synthetic resin such as polycarbonate, and acrylonitrile-butadiene-styrene copolymer (ABS), for example.

As elaborated later, the rotation operation portion 122 is a portion that is operated during a deflection action of deflecting (bending), in two directions, a portion near the distal end (the distal end flexible portion 11A) of the catheter shaft 11. The rotation operation portion 122 is used for the deflection action together with a pair of deflection wires not illustrated in the drawing. Specifically, the rotation operation portion 122 is operated (rotated) by the operator of the ablation catheter 1 during the deflection action. The rotation operation portion 122 includes a lock mechanism 40 and a rotating plate 41 as illustrated in FIG. 2.

Note that each distal end of the pair of deflection wires is fixed on the distal end side of the catheter shaft 11 (e.g., in the vicinity of the distal end tip 110). In addition, each proximal end side of the pair of deflection wires is extended to the inside of the handle 12 (the inside of the handle body 121) from the inside of the catheter shaft 11.

As illustrated in FIG. 2, the rotating plate 41 is a member attached to the handle body 121 such that the rotating plate 41 is rotatable around the rotation axis (Y-axis direction) perpendicular to its axial direction (Z-axis direction). The rotating plate 41 corresponds to the portion actually operated by the operator during the rotation operation, and has a substantially disk shape. Specifically, in this example, an operation of rotating, in two directions, the rotating plate 41 in the Z-X plane with respect to the handle body 121 (the rotation operation around the rotation axis) can be performed as illustrated with arrows d1a and d1b in FIG. 2.

Note that the lock mechanism 40 is a mechanism for fixing (locking) the rotation position of the rotating plate 41 in the Z-Y plane.

Here, a pair of knobs 41a and 41b are provided integrally with the rotating plate 41 at the side surface of the rotating plate 41 as illustrated in FIG. 2. In this example, as illustrated in FIG. 2, the knob 41a and the knob 41b are disposed in point symmetry with each other about the rotation axis of the rotating plate 41. Each of the knobs 41a and 41b corresponds to a portion that is operated (pushed) by the operator to rotate and operate the rotating plate 41 with fingers of one hand, for example. Note that the rotating plate 41 is composed of the same material (synthetic resins and the like) as that of the handle body 121, for example.

In addition, a pair of fasteners not illustrated in the drawing is provided on the rotating plate 41. Each fastener is a member (wire fastener) for separately fixing each proximal end of the pair of deflection wires by screwing and the like. Note that these fasteners can appropriately adjust the drawing length of the portion around each proximal end when fixing each proximal end of the pair of deflection wires.

The deformation operation portion 123 is the portion that is operated by the operator in the deformation operation of changing the shape of the near-distal end structure 6 between the non-deployed shape (petal shape) and the deployed shape (basket shape). The distal end side of the deformation wire 60 used for the deformation operation is fixed to the near-distal end structure 6 (the portion near the distal end tip 110). On the other hand, the proximal end side of the deformation wire 60 is taken out from the proximal end of the handle body 121 and attached to the deformation operation portion 123 as illustrated in FIG. 2.

Specifically, as illustrated with arrows d3a and d3b in FIG. 2, the deformation operation portion 123 is operated along the extension direction (Z-axis direction) of the deformation wire 60. In this manner, the operation of pushing the deformation wire 60 to the handle body 121 and the operation of pulling out the deformation wire 60 from the handle body 121 are performed. That is, as elaborated later, the operation on the deformation operation portion 123 in the direction of the arrows d3a and d3b corresponds to the deformation operation for deforming the near-distal end structure 6. In addition, the shape of the near-distal end structure 6 during the deformation operation can be set to any intermediate shapes between the non-deployed shape (petal shape) and the deployed shape (basket shape) in accordance with the position of the deformation operation portion 123 (a set position along the Z-axis direction).

B. Liquid Supply Device 2

The liquid supply device 2 is a device that supplies the irrigation liquid L to the ablation catheter 1 and includes a liquid supply unit 21 as illustrated in FIG. 1.

As illustrated in FIG. 1, the liquid supply unit 21 supplies the liquid L to the ablation catheter 1 at each occasion under the control of a control signal CTL2 described later. In addition, the action of supplying the liquid L is executed or stopped under the control of the control signal CTL2. Note that the liquid supply unit 21 includes a liquid pump, a resin tube and/or the like, for example.

C. Power Supply Device 3

As illustrated in FIG. 1, the power supply device 3 is a device that supplies a power Pout (a pulse voltage described later) for performing the ablation using the irreversible electroporation between the ablation catheter 1 (the electrode 111 described above) and the counter electrode plate 4 described later, and controls the action of supplying the liquid L in the liquid supply device 2. As illustrated in FIG. 1, the power supply device 3 includes an input unit 31, a power source unit 32, a control unit 33, and a display unit 34.

The input unit 31 is a unit that inputs an instruction signal (operation signal Sm) for instructing a predetermined action and various preset values. The operation signal Sm is input from the input unit 31 in accordance with the operation of the operator (e.g., an engineer or the like) of the power supply device 3. It should be noted that the various preset values may be set in advance in the power supply device 3 at shipment of the product or the like, instead of being input in accordance with the operation of the operator, for example. In addition, the preset value input by the input unit 31 is supplied to the control unit 33 described later. Note that the input unit 31 is composed of a predetermined dial, button, touch panel and the like, for example.

The power source unit 32 is a unit that supplies the power Pout for performing the ablation using the irreversible electroporation between the ablation catheter 1 (the electrode 111) and the counter electrode plate 4 described later in accordance with a control signal CTL1 described later. In addition, as elaborated later, when the ablation is performed by supplying the power Pout, a high pulse voltage (a voltage Vout) is applied to each electrode 111 of the ablation catheter 1. Note that the power source unit 32 is composed of a predetermined power supply circuit (e.g., a switching regulator or the like).

The control unit 33 is a unit that controls the entire power supply device 3 and performs a predetermined arithmetic process, and is composed of a microcomputer and the like, for example. Specifically, first, the control unit 33 has a function (power supply control function) of controlling the action of supplying the power Pout at the power source unit 32 by using the control signal CTL1. During the action of supplying the power Pout, the control unit 33 also controls the pulse voltage (the voltage Vout). In addition, the control unit 33 has a function (liquid supply control function) of controlling the action of supplying the liquid L at the liquid supply device 2 (the liquid supply unit 21) by using the control signal CTL2.

In addition, temperature information It measured at the ablation catheter 1 (a temperature sensor such as a thermocouple or the like disposed corresponding to each electrode 111) is supplied at each occasion to the control unit 33 (see FIG. 1). In addition, a measurement value of an impedance Z between the electrode 111 of the ablation catheter 1 and the counter electrode plate 4 described later is supplied to the control unit 33 at each occasion from the power source unit 32 (see FIG. 1).

Note that details of the action of controlling the pulse voltage at the control unit 33 during the action of supplying the power Pout will be described later (FIGS. 7A to 7E and FIG. 8).

The display unit 34 is a unit (monitor) that displays, and outputs to the outside, various information. Examples of the information to be displayed include various preset values input from the input unit 31, various parameters supplied from the control unit 33, and the temperature information It supplied from the ablation catheter 1. It should be noted that the information to be displayed is not limited to the above-mentioned information, and other information may be displayed instead or additionally. The display unit 34 is composed of a display of a given type (e.g., a liquid crystal display, a CRT (Cathode Ray Tube) display, an organic EL (Electro Luminescence) display and the like).

D. Counter Electrode Plate 4

The counter electrode plate 4 is used in a state of being attached to the body surface of the patient 9 during the ablation as illustrated in FIG. 1, for example. Specifically, during the ablation using the irreversible electroporation, the power Pout is supplied between the ablation catheter 1 (the electrode 111) and the counter electrode plate 4. In addition, during the ablation, the impedance Z is measured at each occasion, and the measured impedance Z is supplied from the power source unit 32 to the control unit 33 in the power supply device 3 (see FIG. 1).

Actions and Functions/Effects

A. Basic Action

The ablation system 5 performs the ablation using the irreversible electroporation on the affected area 90 when treating the affected area 90 with arrhythmia and the affected area 90 with a tumor such as cancer as described above, for example (see FIG. 1). In such ablation, first, the catheter shaft 11 in the ablation catheter 1 is inserted into the body of the patient 9 through the blood vessel as illustrated with an arrow P1 in FIG. 1, for example. Then, the ablation is performed on the affected area 90 by supplying the power Pout (the voltage Vout) between the counter electrode plate 4 and the electrode 111 in the vicinity of the distal end (inside the near-distal end structure 6) of the ablation catheter 1 from the power supply device 3 (the power source unit 32).

In addition, in the embodiment, during such ablation, the irrigation liquid L is supplied to the ablation catheter 1. Specifically, as illustrated in FIG. 2, the liquid L is supplied into the handle body 121 from the proximal end side (liquid inlet) of the handle body 121, for example. In addition, the power supply device 3 (the control unit 33) controls the action of supplying the liquid L in the liquid supply device 2 by using the control signal CTL2. Then, as illustrated in FIG. 2, the liquid L is ejected (injected) to the outside from the vicinity of the distal end (the vicinity of the branch point at the near-distal end structure 6) in the ablation catheter 1, for example. The injection of the liquid L achieves improvement of the blood retention during ablation, and thus avoids sticking of blood clots to the treated portion.

A-1. Deflection Action of Distal End Flexible Portion 11A Through Rotation Operation Here, in the ablation catheter 1, the shape of the portion near the distal end (the distal end flexible portion 11A) of the catheter shaft 11 changes in two directions in accordance with the rotation operation of the rotating plate 41 by the operator. That is, during the ablation on the affected area 90, the action of deflecting, in two directions, the distal end flexible portion 11A (the above-described bidirectional deflection action) is performed in accordance with the rotation operation.

Specifically, for example, when the operator rotates the rotating plate 41 in the direction of the arrow d1*a* (right-handed rotation) in FIG. 2 by grabbing the handle 12 (the handle body 121) with one hand and operating the knob 41*a* with fingers of the one hand, the following occurs. That is, in the catheter shaft 11, one of the pair of deflection wires is pulled to the proximal end side. Then, the distal end flexible portion 11A of the catheter shaft 11 is curved (bent) along the direction illustrated with the arrow d2*a* in FIG. 2.

In addition, for example, when the operator rotates the rotating plate 41 in the direction of the arrow d1*b* (left-handed rotation) in FIG. 2 by operating the knob 41*b*, the following occurs. That is, in the catheter shaft 11, the other of the pair of deflection wires is pulled to the proximal end side. Then, the distal end flexible portion 11A of the catheter shaft 11 is curved along the direction illustrated with the arrow d2*b* in FIG. 2.

As described above, when the operator rotates the rotating plate 41, the bidirectional (pivoting) deflection action at the catheter shaft 11 can be performed. Note that by rotating the handle body 121 around the axis (in the X-Y plane), the curving direction (deflection direction) of the distal end flexible portion 11A of the catheter shaft 11 can be freely set in the state where the catheter shaft 11 is inserted in the patient's body, for example. In this manner, since the ablation catheter 1 is provided with a deflection mechanism for deflecting the distal end flexible portion 11A in two directions, the catheter shaft 11 can be inserted to the body of the patient 9 while changing the shape of the portion near the distal end (the distal end flexible portion 11A).

A-2. Deformation Action of Near-Distal End Structure 6 Through Deformation Operation Next, with reference to FIGS. 3A and 3B and FIGS. 4A and 4B, in addition to FIG. 2, deformation action of the near-distal end structure 6 of the catheter shaft 11 through a deformation operation on the deformation operation portion 123 is described.

Figure 3A:
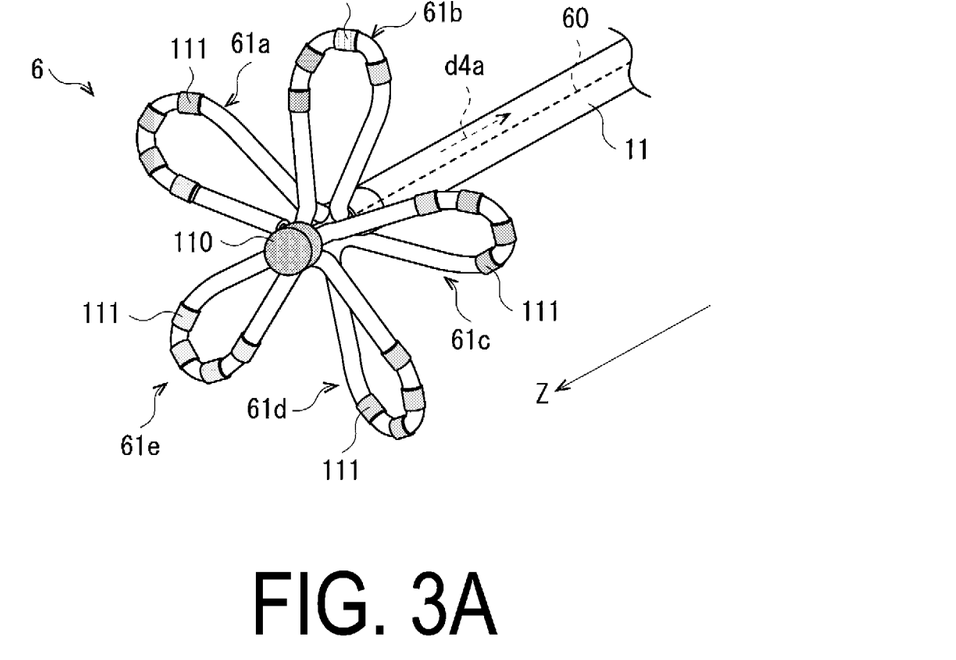
FIGS. 3A and 3B are schematic diagrams illustrating an example of a deformed state of a portion near the distal end of a catheter shaft illustrated in FIG. 2.
Figure 3B:
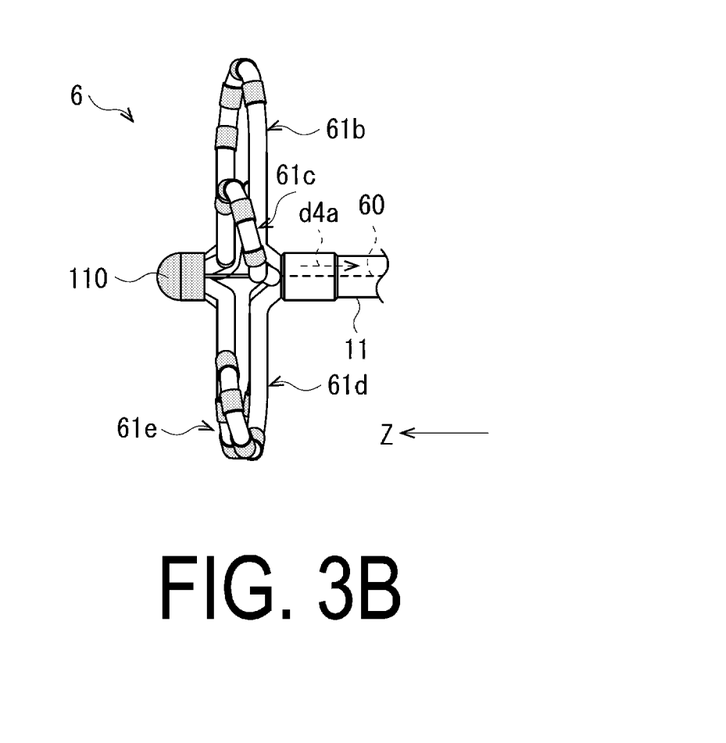

FIGS. 3A and 3B schematically illustrate an example of a deformed state of the portion near the distal end (the near-distal end structure 6) of the catheter shaft 11 (the state of the petal shape as an example of the non-deployed shape). In addition, FIGS. 4A and 4B schematically illustrate another example of a deformed state of the portion near the distal end (the near-distal end structure 6) of the catheter shaft 11 (the state of the basket shape as an example of the deployed shape). Note that the deployed shape (basket shape) illustrated in FIGS. 4A and 4B is merely an example, and a shape obtained by slightly deflating (distorting) the shape illustrated in FIGS. 4A and 4B and the like may also be adopted, for example.

First, for example, as illustrated with the arrow d3*a* in FIG. 2, when an operation of pulling out the deformation wire 60 from the handle body 121 is performed through the deformation operation on the deformation operation portion 123 by the operator, the following occurs. That is, in this case, the deformation wire 60 is pulled to the proximal end side through the above-described pulling operation as illustrated with an arrow d4*a* in FIGS. 3A and 3B because the proximal end side of the deformation wire 60 is attached to the deformation operation portion 123 as described above, for example. Then, the distal end tip 110 is pulled to the proximal end side as illustrated in FIGS. 3A and 3B and each of the branch structures 61*a* to 61*e* has a shape constricted to the proximal end side because the distal end side of the deformation wire 60 is fixed to the near-distal end structure 6 (the vicinity of the distal end tip 110) as described above, for example. That is, the near-distal end structure 6 has the non-deployed shape (in this example, a substantially flattened shape in the X-Y plane). Specifically, in this example, as illustrated in FIG. 3A, the near-distal end structure 6 has the petal shape composed of each of the branch structures 61*a* to 61*e*.

On the other hand, as illustrated with the arrow d3*b* in FIG. 2, when an operation of pushing the deformation wire 60 to the handle body 121 is performed through the deformation operation on the deformation operation portion 123 by the operator, for example, the following occurs. That is, in this case, as illustrated with an arrow d4*b* in FIGS. 4A and 4B, the deformation wire 60 is pushed to the distal end side through the pushing operation, for example. Then, as illustrated in FIGS. 4A and 4B, the distal end tip 110 is pushed to the distal end side, and a shape in which each of the branch structures 61*a* to 61*e* is deployed to the distal end side is obtained, for example. That is, the near-distal end structure 6 becomes the deployed shape (a shape deployed to the distal end side along the Z-axis direction). Specifically, in this example, as illustrated in FIG. 4A, the near-distal end structure 6 becomes the basket shape composed of each of the branch structures 61*a* to 61*e*.

In this manner, the near-distal end structure 6 is deformed in accordance with the deformation operation on the deformation operation portion 123.

B. Ablation Using Irreversible Electroporation

Now, details of the ablation using the irreversible electroporation (IRE) are described.

First, the irreversible electroporation has attracted attention because it is a non-thermal ablation method as described above and can suppress damages to the surrounding blood vessels and nerves. Specifically, RFA (Radio Frequency Ablation) and cryo (freezing) ablation, which are commonly known ablation methods, use thermal energy, and as such may cause complications such as transverse paralysis and esophageal fistula. On the other hand, the ablation using the irreversible electroporation is PFA (Pulsed electric Field Ablation) using non-thermal energy, and therefore does not cause such complications.

Specifically, in general, during the ablation using the irreversible electroporation, the cardiac muscle (the threshold value of the electric field intensity: about 400 [V/cm]) is affected first by the ablation. It should be noted that in general the electric field intensity during the ablation is set to a value (e.g., about 1000 to 1500 [V/cm]) that does not affect the esophagus (the threshold value of the electric field intensity: about 1750 [V/cm]) or the diaphragmatic nerve (the threshold value of the electric field intensity: about 3800 [V/cm]). As a result, complications such as transverse paralysis and esophageal fistula are not caused as described above.

Figure 5A:
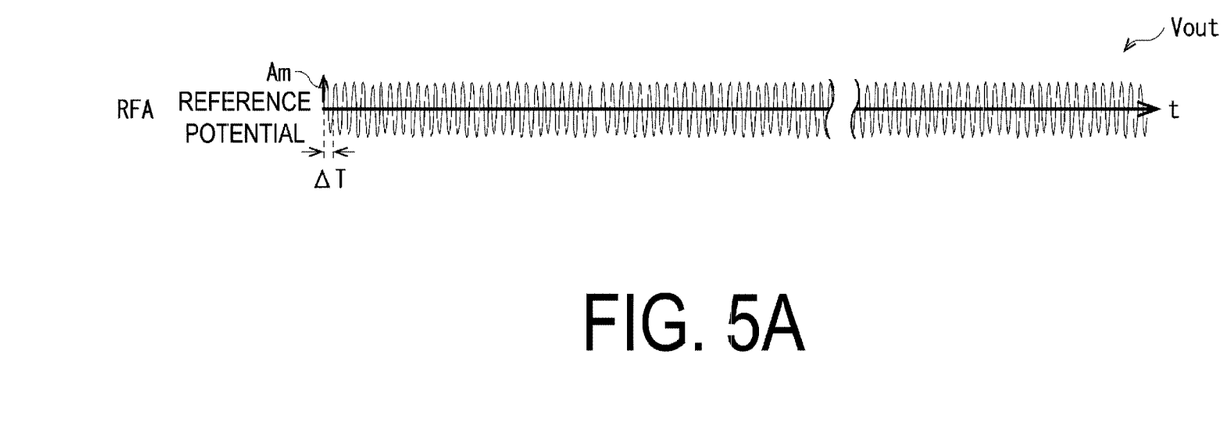
FIGS. 5A and 5B are timing diagrams illustrating a typical voltage waveform example during ablation.
Figure 5B:
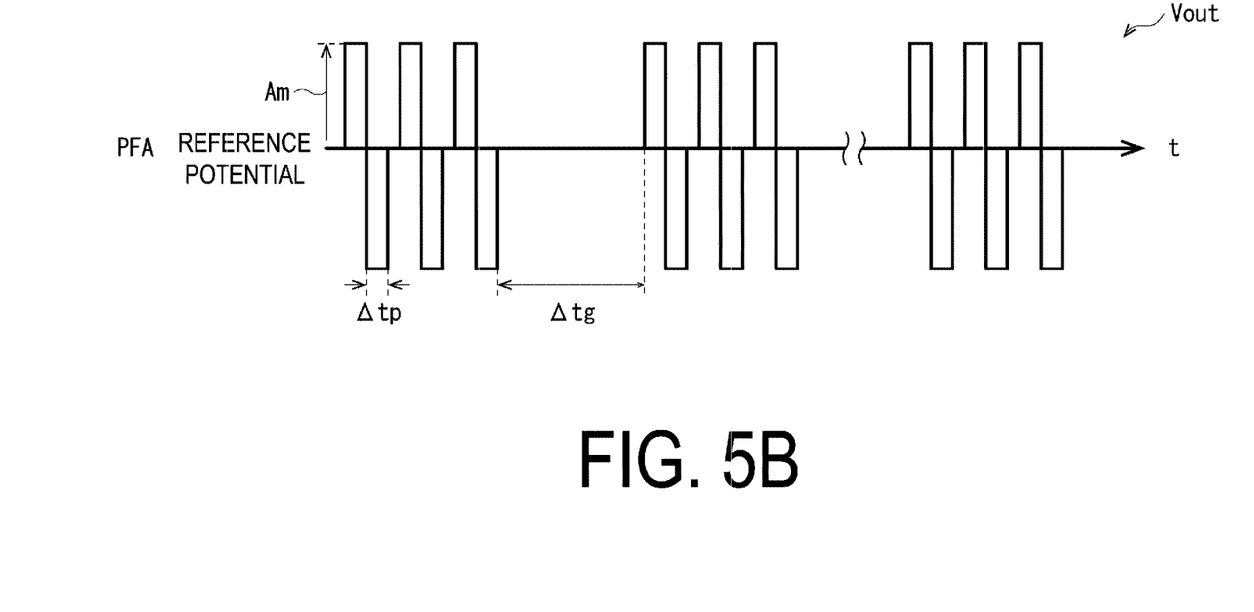

FIGS. 5A and 5B are timing diagrams illustrating a typical voltage waveform example during ablation. Specifically, FIG. 5A illustrates a waveform example of a typical voltage Vout applied to an electrode of an ablation catheter during the RFA, and FIG. 5B illustrates a waveform example of a typical voltage Vout applied to an electrode of an ablation catheter during the ablation using the irreversible electroporation (the PFA). Note that in FIGS. 5A and 5B, the abscissa indicates a time t, and the ordinate indicates a voltage (a potential difference from the reference potential illustrated in the drawing).

First, in the example of the RFA illustrated in FIG. 5A, the voltage Vout is a voltage of a high frequency (frequency=500 [kHz] and a period $\Delta T$=about 2 [μs]), and an amplitude value Am of the voltage Vout is about 70 V. Note that the power supplied during this RFA is about 25[W], for example. In addition, in the case of this RFA, a high-frequency continuous wave as that illustrated in FIG. 5A is continued for long periods of time (e.g., the order of several tens of seconds of about 30 to 60 [s]), and as such this RFA is a thermal ablation method, for example.

On the other hand, in the example of the PFA illustrated in FIG. 5B, the voltage Vout is a pulse voltage of a high voltage (the amplitude value Am=about 1500 [V]) and a short duration (a pulse width $\Delta tp$=about 100 [μs]). That is, this PFA, with the pulse wave form of such a short duration (the above-described μs order), is a non-thermal ablation method unlike the RFA. In addition, in the ablation using the irreversible electroporation, the electroporation is generated by applying the pulse voltage of a high voltage and a short duration to the electrode. Specifically, by making nano-scale holes in the cells subjected to the ablation with the pulse voltage, apoptosis (cellular suicide) is induced in the cells with the holes to thereby kill the cells.

C. Action of Controlling Pulse Voltage

Next, with reference to FIGS. 6A to 6E, FIGS. 7A to 7E, and FIG. 8, an action of controlling the voltage Vout (the pulse voltage) at the control unit 33 during the ablation using the irreversible electroporation is elaborated by comparison with a comparative example.

FIGS. 6A to 6E schematically illustrate a voltage waveform example and the like during ablation according to a comparative example, and FIGS. 7A to 7E schematically illustrate a voltage waveform example and the like during ablation according to an example of the embodiment. In addition, FIG. 8 illustrates an example of a relationship of the levels of various parameters (an amplitude value difference $\Delta V$ and threshold values $\Delta V th1$ and $\Delta V th2$ described later) illustrated in FIGS. 6A to 6E and FIGS. 7A to 7E.

Figure 6A:
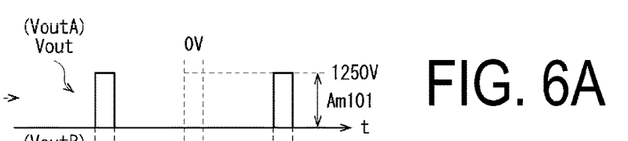
FIGS. 6A to 6E are schematic diagrams illustrating a voltage waveform example and the like during ablation according to a comparative example.
Figure 6B:
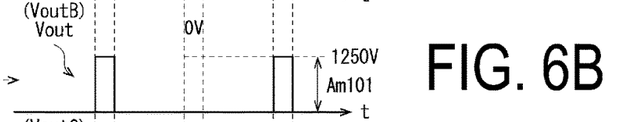
Figure 6C:
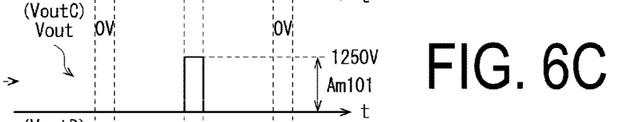
Figure 6D:
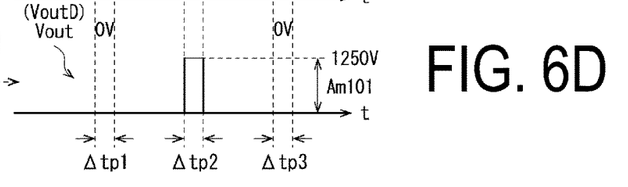
Figure 6E:
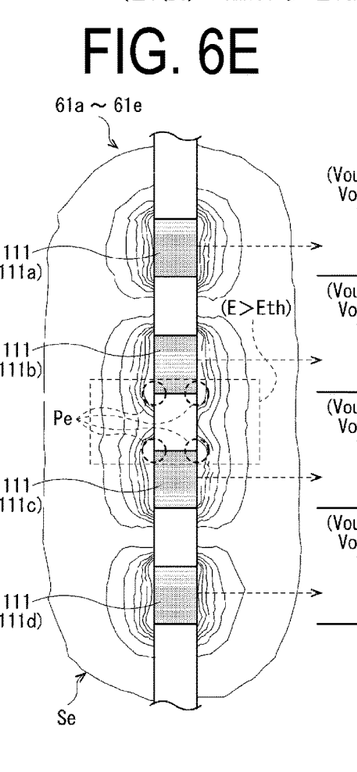
Figure 7A:
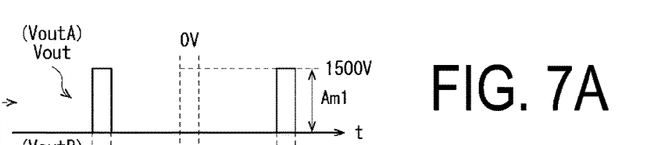
FIGS. 7A to 7E are schematic diagrams illustrating a voltage waveform example and the like during ablation according to an example.
Figures 7B, 7C, 7D:
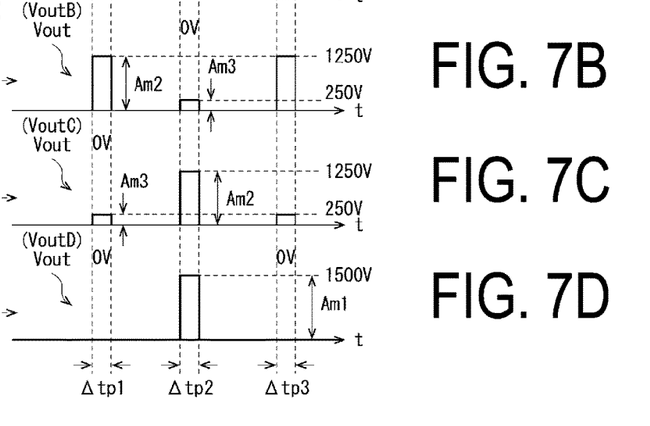
Figure 7E:
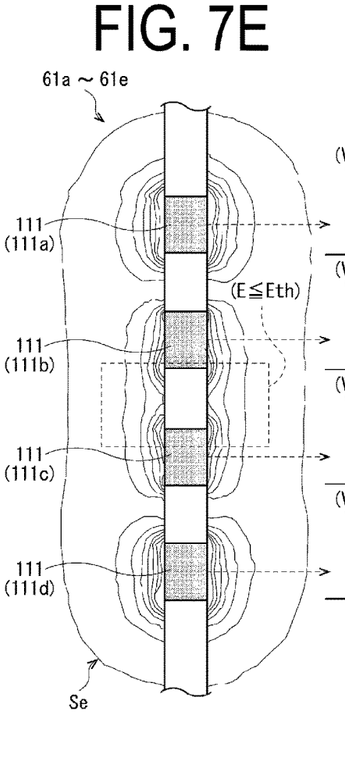
Figure 8:
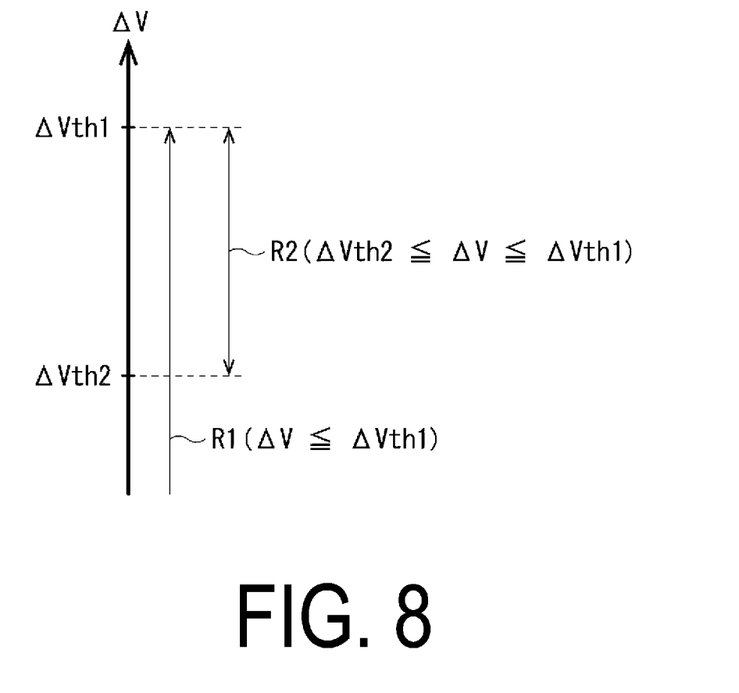
FIG. 8 is a diagram illustrating an example of a relationship of levels of various parameters illustrated in FIGS. 6A to 6E and FIGS. 7A to 7E.

Specifically, FIGS. 6E and 7E schematically illustrate examples of an equipotential surface Se of the electric field generated through application of the voltage Vout (pulse voltage) in the vicinity of the four electrodes 111 (application electrode: referred to as the electrodes 111a to 111d for convenience) disposed in each of the branch structures 61a to 61e. In addition, FIGS. 6A to 6D and FIGS. 7A to 7D schematically illustrate timing waveform examples of the voltages Vout (pulse voltages VoutA to VoutD) individually applied to the electrodes 111a to 111d. Note that the pulse voltages VoutA to VoutD illustrated in FIGS. 6A to 6D and FIGS. 7A to 7D are in-phase pulse voltages (see the pulse widths $\Delta tp1$, $\Delta tp2$ and $\Delta tp3$). In addition, in FIGS. 6A to 6D and FIGS. 7A to 7D, the abscissa indicates the time t, and the ordinate indicates a voltage (the potential difference from the reference potential).

C-1. Comparative Example

First, in the comparative example illustrated in FIGS. 6A to 6E, in the periods of the pulse widths $\Delta tp1$ and $\Delta tp3$, the group of the pulse voltages VoutA and VoutB is set to the amplitude value Am101=1250 [V] while the group of the pulse voltages VoutC and VoutD is set to 0 [V]. On the other hand, in the period of the pulse width $\Delta tp2$, the group of the pulse voltages VoutA and VoutB is set to 0 [V] while the group of the pulse voltages VoutC and VoutD is set to the amplitude value Am101=1250 [V]. That is, in this comparative example, the pulse voltages VoutA to VoutD with one positive (>0) amplitude value Am101 (=1250 [V]) are individually applied to the four application electrodes (the electrodes 111a to 111d).

In this manner, in the ablation using the irreversible electroporation, a significantly high voltage (in the comparative example illustrated in FIGS. 6A to 6E, the amplitude value Am101=1250 [V]) is applied to each electrode 111 (the electrodes 111a to 111d) as described above. However, as a result of electric-field concentration due to such a high voltage, electrostatic discharges may be more likely to occur from the end portion of the electrode 111.

Specifically, in the comparative example illustrated in FIGS. 6A to 6E, the absolute value of the amplitude value difference $\Delta V$ of the pulse voltages VoutB and VoutC of the electrodes 111b and 111c adjacent to each other among the four electrodes 111a to 111d, i.e., the amplitude value difference $\Delta V$ (BC)=Am101, is significantly large. Specifically, as illustrated in FIGS. 6A to 6E, the amplitude value difference $\Delta V$ (BC)=Am101 is larger than a predetermined threshold value $\Delta V th1$ ($\Delta V$ (BC)>$\Delta V th1$). Then, as indicated with a reference numeral Pe in FIGS. 6A to 6E, the electric-field concentration (a region with an electric field intensity E greater than a predetermined electric field threshold value Eth) due to the significantly large amplitude value difference $\Delta V$ may occur at the inner end portions of the electrodes 111b and 111c, and electrostatic discharge may be generated.

Then, when such an electrostatic discharge is generated at the end portion of the electrode 111, thrombus may occur and the indwelling position of the ablation catheter 1 (indwelling position inside the body of the patient 9) may be displaced due to the impact of the electrostatic discharge during the ablation treatment. As a result, with the ablation of this comparative example, the effectiveness of the ablation treatment is low.

C-2. Example of Present Embodiment

On the other hand, in the example of the embodiment illustrated in FIGS. 7A to 7E, in the period of the pulse widths $\Delta tp1$ and $\Delta tp3$, an amplitude value Am1 of a pulse voltage VoutA=1500 [V], an amplitude value Am2 of a pulse voltage VoutB=1250 [V], an amplitude value Am3 of a pulse voltage VoutC=250 [V], and a pulse voltage VoutD=0 [V] are set. In the period of the pulse width $\Delta tp2$, the pulse voltage VoutA=0 [V], the amplitude value Am3 of the pulse voltage VoutB=250 [V], the amplitude value Am2 of the pulse voltage VoutC=1250 [V], and the amplitude value Am1 of the pulse voltage VoutD=1500 [V] are set. That is, in this example, unlike the above-described comparative example, the pulse voltages VoutA to VoutD with a plurality of types of positive amplitude values (in this example, the three types of positive amplitude values, Am1, Am2 and Am3) are individually applied to the four application electrodes (the electrodes 111a to 111d).

At this time, in the embodiment, the control unit 33 uses the pulse voltages with the plurality of types of positive amplitude values to perform the following control. That is, the control unit 33 performs the control such that the absolute value of the amplitude value difference $\Delta V$ of the pulse voltages at the electrodes 111 adjacent to each other among the four electrodes 111a to 111d is smaller than the threshold value $\Delta Vth1$, and that as a result the electric field intensity E in the vicinity of the electrodes 111 adjacent to each other is the electric field threshold value Eth or smaller.

Specifically, in the example illustrated in FIGS. 7A to 7E, unlike the above-described comparative example, the absolute value of the amplitude value difference $\Delta V$ of the pulse voltages VoutB and VoutC at the electrodes 111b and 111c adjacent to each other, i.e., the amplitude value difference $\Delta V$ (BC)=|Am2−Am3| (=1000 [V]), is controlled to be the threshold value $\Delta Vth1$ or smaller ($\Delta V$ (BC)≤$\Delta Vth1$). Note that in this example, the absolute value (=250 [V]) of the amplitude value difference $\Delta V$ of the pulse voltages VoutA and VoutB of the electrodes 111a and 111b adjacent to each other, and the absolute value (=250 [V]) of the amplitude value difference $\Delta V$ of the pulse voltages VoutC and VoutD of the electrodes 111c and 111d adjacent to each other are also controlled to be the threshold value $\Delta Vth1$ or smaller.

As elaborated later, in the example of the embodiment, the electric-field concentration due to the high pulse voltage is easily suppressed through the control of the pulse voltages VoutA to VoutD than in the above-described comparative example. Specifically, as illustrated in FIGS. 7A to 7E, the electric field intensity E at the end portion in the vicinity of the electrodes 111b and 111c adjacent to each other is the electric field threshold value Eth or smaller (E≤Eth) unlike in the above-described comparative example, for example.

In addition, as illustrated in FIG. 8, for example, the range of the absolute value of the amplitude value difference $\Delta V$ may be set as follows. That is, first, as described above, the absolute value of the amplitude value difference $\Delta V$ may be set to a range equal to or smaller than the threshold value $\Delta Vth1$ (the range R1: $\Delta V$≤$\Delta Vth1$ illustrated in FIG. 8). In addition, the control unit 33 may perform the control such that the maximum value of the absolute value of the amplitude value difference $\Delta V$ of the pulse voltages at the electrodes 111 adjacent to each other is the threshold value $\Delta Vth2$ or greater (see a range R2 illustrated in FIG. 8). Note that the range R2 illustrated in FIG. 8 is ($\Delta Vth2$≤$\Delta V$≤$\Delta Vth1$) for convenience, but preferably, the control object to be set to the threshold value $\Delta Vth2$ or greater is set to the maximum value of the absolute value of the amplitude value difference $\Delta V$ as described above, rather than to the absolute value of the amplitude value difference $\Delta V$ itself.

Note that the threshold values $\Delta Vth1$ and $\Delta Vth2$ correspond to specific examples of the "first threshold value" and "second threshold value", respectively, in the disclosure. In addition, a specific example of the threshold value $\Delta Vth1$ is $\Delta Vth1$=about 1100 to 1500 [V], and is preferably $\Delta Vth1$=about 1300 [V]. In addition, a specific example of the threshold value $\Delta Vth2$ is $\Delta Vth2$=about 500 to 900 [V], and is preferably $\Delta Vth2$=about 700 [V].

D. Functions and Effects

In this manner, the ablation system 5 of the embodiment provides the following functions and effects, for example.

First, in the embodiment, when the ablation using the irreversible electroporation is performed, the voltage Vout (pulse voltage) is controlled such that pulse voltages (e.g., the pulse voltages VoutA to VoutD) with a plurality of types of positive amplitude values (e.g., three types of positive amplitude values Am1 to Am3) are applied to the three or more application electrodes (the electrode 111). Through the control of applying the pulse voltages with the plurality of types of positive amplitude values, the electric-field concentration due to the high pulse voltages is easily suppressed as described above, and the electrostatic discharge from the end portion of the application electrode occurs less. As a result, during the ablation using the irreversible electroporation, the occurrence of thrombus and displacement of the indwelling position of the ablation catheter 1 are easily suppressed. Thus, in the embodiment, the effectiveness of the ablation treatment using the irreversible electroporation can be improved.

In addition, in the embodiment, the absolute value of the amplitude value difference $\Delta V$ of the pulse voltage of the application electrodes adjacent to each other is controlled to be the threshold value $\Delta Vth1$ or smaller by using the pulse voltages with a plurality of types of positive amplitude values such that as a result the electric field intensity E in the vicinity of the application electrodes adjacent to each other is controlled to be the predetermined the electric field threshold value Eth or smaller. In this manner, the electric field intensity E in the vicinity of the application electrode adjacent to each other becomes a predetermined electric field threshold value or smaller, and thus the electric-field concentration is further easily suppressed. Thus, the electrostatic discharge is further less generated, and therefore the occurrence of thrombus and displacement of the indwelling position of the ablation catheter 1 are further easily suppressed. As a result, the effectiveness of the ablation treatment using the irreversible electroporation can be further improved.

Further, in the embodiment, when the maximum value of the absolute value of the amplitude value difference $\Delta V$ of the pulse voltage is controlled to be the threshold value $\Delta Vth2$ or greater, the following occurs. That is, the absolute value of the amplitude value difference $\Delta V$ of the pulse voltage is controlled to be the threshold value $\Delta Vth1$ or smaller while the maximum value of the absolute value of the amplitude value difference $\Delta V$ is secured at the minimum value (the threshold value $\Delta Vth2$) or greater, and thus, as described above, the electric-field concentration is suppressed while ensuring the range (ablation range) in which the electric field is generated. As a result, the effectiveness of the ablation treatment using the irreversible electroporation can be further improved.

Additionally, in the embodiment, since the three or more application electrodes are all composed of the electrode 111 (three or more electrodes 111) of the ablation catheter 1, the following is achieved. That is, the application electrode to which the pulse voltage to be controlled during the ablation is applied is composed only of the electrode 111 of the ablation catheter 1, and thus such a pulse voltage can be easily controlled. As a result, the convenience of the ablation using the irreversible electroporation can be improved.

2. Modifications

The disclosure is not limited to the above-described embodiments, and various modifications may be made.

For example, the materials of the members and the like described in the embodiment are not limitative, and other materials may be used. In addition, while the specific configurations of the ablation catheter 1 are described in the embodiment, all the members need not necessarily be provided, and other members may be further provided. Specifically, as a pivoting member, a leaf spring that is deformable in the bending direction may be provided inside the catheter shaft 11, for example.

In addition, while the specific configurations of the handle 12 (the handle body 121 and the rotation operation portion 122) are described in the embodiment, all the members need not necessarily be provided and other members may be further provided. Specifically, the configuration of the deformation operation portion 123 is not limited to the embodiment, other configurations may be adopted, for example.

Further, the shape of the portion near the distal end of the catheter shaft 11 is not limited to the shape described in the embodiment. Specifically, the embodiment describes an example of an ablation catheter of a type (bidirectional type) in which the shape of the portion near the distal end of the catheter shaft 11 changes in both directions in accordance with the operation of the rotating plate 41, but this is not limitative. That is, for example, it is possible to adopt an ablation catheter of a type (single directional type) in which the shape of the portion near the distal end of the catheter shaft 11 changes in one direction in accordance with the operation of the rotating plate 41. In this case, the number of the operating wire is one. In addition, it is possible to adopt an ablation catheter of a type in which the shape of the portion near the distal end of the catheter shaft 11 is fixed. In this case, the operating wire, the rotating plate 41 and the like become unnecessary.

In addition, the arrangement, shape, number (one or more) and the like of the electrodes 111 at the portion near the distal end of the catheter shaft 11 (inside the near-distal end structure 6) are not limited to those described in the embodiment. Further, the shape of the near-distal end structure 6 is also not limited to the shape (the flat shape (petal shape), the non-flat shape (basket shape) and the like) described in the embodiment, and other shapes may be adopted. Additionally, the configuration of the near-distal end structure 6 itself (the arrangement, shape, number and the like of the branch point, the joining point, and the plurality of branch structures) is not limited to the configuration described in the embodiment, and other configurations may be adopted.

Additionally, the values, ranges, relationships of levels and the like of the various parameters described in the embodiment are not limited to those described in the embodiment, and other values, ranges, relationships of levels and the like may be adopted.

In addition, while the specific block configurations of the liquid supply device 2 and the power supply device 3 are described in the embodiment, all the blocks described in the embodiment need not necessarily be provided, and other blocks may further be provided. Further, the ablation system 5 in its entirety may further include other devices in addition to the devices described in the embodiment.

Further, the control action (the process action of ablation using the above-described control of pulse voltages and the like) of the control unit 33 including the power supply control function and the liquid supply control function is described in detail in the embodiment. However, the method of the control (the method for the ablation through the control of pulse voltages and the like) in the power supply control function, the liquid supply control function and the like are not limited to the method described in the embodiment. Specifically, while the method of controlling the pulse voltage such that the pulse voltages with a plurality of types of positive amplitude values is applied is described in detail in the embodiment, the method described in the embodiment is not limitative, and the pulse voltage may be controlled using other methods. In addition, instead of the control for setting the absolute value of the amplitude value difference $\Delta V$ of the pulse voltage to the threshold value $\Delta Vth1$ or smaller, and the control for setting the maximum value of that absolute value of the amplitude value difference $\Delta V$ is the threshold value $\Delta Vth2$ or greater as described in the embodiment, other control methods may be adopted.

Additionally, while the case where the three or more application electrodes to which pulse voltage is applied are all composed of the electrodes 111 of the ablation catheter 1 is described in the embodiment, this example case is not limitative. That is, for example, the three or more application electrodes to which the pulse voltage is applied may include another electrode (such as the counter electrode plate 4) together with the electrodes 111 of the ablation catheter. In addition, while the case where the power Pout for performing the ablation using the irreversible electroporation is supplied between the counter electrode plate 4 and the plurality of electrodes 111 in the ablation catheter 1 is described as an example in the embodiment and so forth, this example is not limitative. That is, the method of supplying the power Pout to the plurality of electrodes 111 may be a method of supplying the power Pout between the plurality of electrodes 111 without using the counter electrode plate 4, for example.

In addition, the series of processes described in the embodiment may be executed by hardware (circuit) or by software (program). When executing the process by software, the software is composed of a program group for causing a computer to execute each function. Each program to be used may be incorporated in the computer in advance, or may be installed in the computer from a network or a recording medium, for example.

Further, while an example of the ablation catheter 1 (provided with an irrigation mechanism) that injects to the outside the liquid L for irrigation is described in the embodiment, this example is not limitative, and the disclosure is also applicable to an ablation catheter that does not include such an irrigation mechanism.

In addition, while examples where the part to be subjected to the ablation is the affected area 90 with arrhythmia and/or the affected area 90 with tumor in the body of the patient 9 are described in the embodiment, these examples are not limitative. That is, the ablation system of the disclosure is also applicable to the case where the part to be subjected to the ablation is other parts (e.g., organs and body tissues) in the body of the patient 9.

Further, the various examples described above may be applied in any combination.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A power supply device, comprising:
   a power source unit configured to supply, to a plurality of electrodes in an ablation catheter, power to be used for performing ablation using irreversible electroporation; and
   a control unit configured to control pulse voltages such that when the ablation is performed by supplying the power, the pulse voltages with a plurality of types of positive amplitude values are applied to three or more application electrodes respectively including the plurality of electrodes in an identical period of time.

2. The power supply device according to claim 1, wherein the control unit performs a control, by using the pulse voltages with the plurality of types of positive amplitude values, such that an absolute value of an amplitude value difference of the pulse voltages between application electrodes adjacent to each other among the three or more application electrodes is a first threshold value or smaller, and then performs a control such that an intensity of an electric field in a vicinity of the application electrodes adjacent to each other is a predetermined electric field threshold value or smaller.

3. The power supply device according to claim 2, wherein the control unit performs a control such that a maximum value of the absolute value of the amplitude value difference of the pulse voltages between the application electrodes adjacent to each other is a second threshold value or greater.

4. The power supply device according to claim 1, wherein each of the three or more application electrodes is composed of three or more electrodes serving as the plurality of electrodes in the ablation catheter.

5. The power supply device according to claim 1, wherein the ablation catheter is a catheter used for treating arrhythmias by performing the ablation on an affected area in a body of a patient.

6. An ablation system comprising:
   an ablation catheter including a plurality of electrodes; and
   a power supply device, wherein
   the power supply device includes:
   a power source unit configured to supply power to be used for performing ablation using irreversible electroporation on the plurality of electrodes in the ablation catheter, and
   a control unit configured to control pulse voltages such that when the ablation is performed by supplying the power, the pulse voltages with a plurality of types of positive amplitude values are applied to three or more application electrodes respectively including the plurality of electrodes in an identical period of time.

* * * * *